United States Patent [19]

Dorfer

[11] 3,996,730
[45] Dec. 14, 1976

[54] MACHINE FOR HARVESTING GRAPE-BERRIES FROM GRAPE-BUNCHES

[76] Inventor: Walter Dorfer, via Hoffer, 39010 Nalles (Bolzano), Italy

[22] Filed: Dec. 9, 1974

[21] Appl. No.: 530,860

[30] Foreign Application Priority Data

Dec. 11, 1973 Italy .................................. 1732/73
Sept. 10, 1974 Italy ............................... 83398/74

[52] U.S. Cl. .............................................. 56/330
[51] Int. Cl.² ...................................... A01D 46/00
[58] Field of Search .......... 56/330, 331; 130/30 R, 130/30 D, 30 J

[56] References Cited

UNITED STATES PATENTS

| 2,496,858 | 2/1950 | Crowley | 130/30 D |
| 3,360,913 | 1/1968 | Burton | 56/330 |
| 3,426,517 | 2/1969 | Duncan, Sr. | 56/330 |
| 3,492,801 | 2/1970 | Olmo et al. | 56/330 |

*Primary Examiner*—Russell R. Kinsey
*Attorney, Agent, or Firm*—Robert E. Burns; Emmanuel J. Lobato; Bruce L. Adams

[57] ABSTRACT

A frame, positioned adjacent a selected vine, carries clasping fingers, whereto the worker attaches vine-branches, removed from the vine and which bear grape-bunches. The clasping fingers and the vine-branches clasped thereby are shaken to remove relatively ripe grape-berries from the grape-bunches, while the resulting grape-stalks continue to be held by the clasping fingers so that they cannot be mixed with the shaken-off grape-berries. When the shaken-off grape-berries have been collected, the grape-stalks are manually or automatically unhooked from the clasping fingers.

11 Claims, 8 Drawing Figures

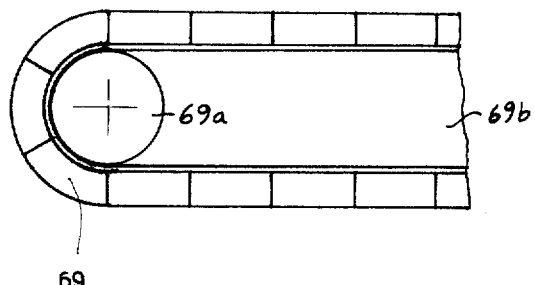
FIG.5.
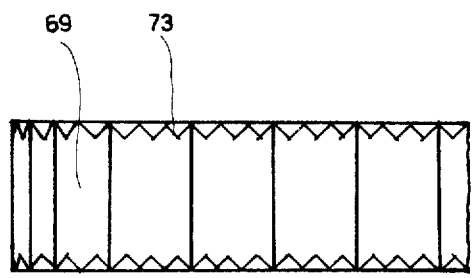
FIG.6.
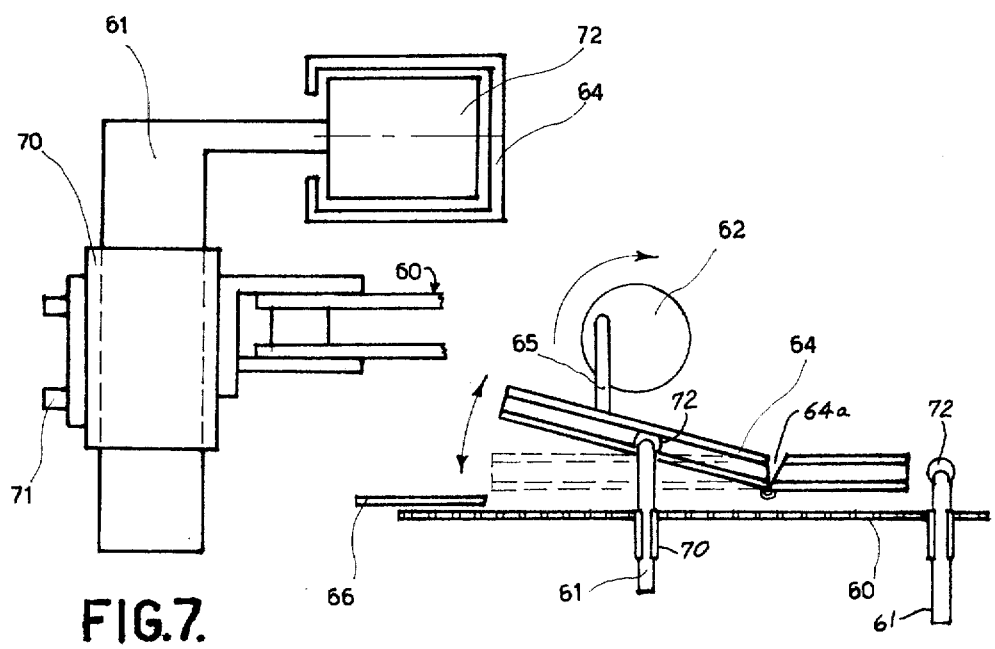
FIG.7.
FIG.8.

MACHINE FOR HARVESTING GRAPE-BERRIES FROM GRAPE-BUNCHES

BACKGROUND OF THE INVENTION

This invention relates to a machine for mechanical grape-harvesting.

Generally speaking, grape-harvesting machines that are already on the market are constituted by a cylindrical drum made of perforated sheet iron and by a beating coiler supplied with helicoidal blades. The beating coiler turns fast inside the walls of the cylindrical drum.

When the bunches of grapes are brought in from the opening of the machine, they are hit by the turning blades. In such a way, while the peels and the must come out from the holes of the drum to be gathered in suitable containers, grape-stalks are pushed by the propellers towards the other end, where they dump.

This known kind of machine has a remarkable disadvantage. While it treats the bunches of grapes, grape-stalks and other sorts of impurities (for instance: leaves, dry vine-tendrils, etc) are also crushed together. Consequently, the juice which is obtained is impure.

The basic object of the invention is to obviate this disadvantage by providing for a machine which harvest grapes from grape bunches and vine branches so as to obtain the must without any impurities.

Another important object of the invention is to provide for a machine that can be easily driven amid the rows of vines to receive cut-off vine-branches, avoiding the necessity to attend not only to the harvesting of the bunches of grapes and to their transport to the machine, but also to the looping off of the vine-braches.

SUMMARY OF THE INVENTION

The new machine comprises:
at least one basin (tub) that can be moved along the ground;
at least one arm stretching out above said basin and swinging continuously when commanded;
clasping means placed on said arm and suitable to receive vine-branches;
one conveyor placed on the basin's bottom to convey from it the grape-berries which have been removed from the bunches of the vine-branches, to and through a suitable pipe.

The swinging of the arm causes the fall of the grapes into the basin below it, while the grape-stalks keep on hanging on the branches since they are held by the clasping means.

A preferred embodiment is a grape-harvester characterized by a wheel-mounted frame at whose sides there are two basins and several clasping elements which can swing above the basins. Each clasping element is held at the end of an arm and may comprise mechanical fingers whose opening and closing positions may be controlled by means of pneumatic double-acting cylinders.

The basin may be provided with sucking means — i.e., a suction pump — to facilitate the discharge therefrom of the grape-berries, which slide down into suitable containers.

Furthermore, in order to avoid the conveying of leaves, sticks and other impurities into the latter containers, the machine may be provided with a fan that blows air through special ducts into the basins, causing expulsion of such impurities.

The working of the swinging arms, of the suction pump and of the fan can be carried out by connecting them to a suitable power take-off — e.g., on a tractor — or by any other suitable and proper way.

The new machine reduces the work needed for the grape-harvesting and at the same time improves the quality of the must.

In this connection, it must be noticed that the new machine not only avoids squeezing the grape-stalks and the impurities together with the grapes, but also prevents the green grape-berries from being mixed with the ripe ones. Indeed, even after the grape-harvesting has been effected with the new machine, the unripe, green grape-berries still stick to their grape-stalks since the swinging movement of the mechanical arms that hold the branches cannot cause their fall.

Advantageously, one embodiment of the invention provides for the use of one or more chain (or belt) conveyors, which carry the bunches or grapes from outside the machine to its inside, where the worker operates. There, after the branches have been well shaken to gather the ripe grape-berries, the branches are pushed outside and automatically unhooked. This makes it possible to furnish the machine with a plurality of automatic or manual hooks. The worker need not wait for the perfect shaking of each vine-branch before applying the shaking arm to another branch because new free hooks arrive continuously.

According to a further feature the grape-berries which are not yet separated from leaves and other impurities are conveyed onto a rasping grid, which allows the falling of the previously selected fruit on another belt conveyor either by simply applying the law of gravity or by means of another shaking produced by the rasping grid itself.

BRIEF DESCRIPTION OF THE DRAWINGS

FIG. 5 is a side view of a final belt conveyor in the machine according to FIG. 4;
FIG. 6 is a plan view of the belt conveyor of FIG. 5;
FIG. 7 is a front view of the shaking apparatus of the clasping means according to FIG. 3;
FIG. 8 is a side view of the shaking apparatus.

PREFERRED EMBODIMENTS OF THE INVENTION

Figure 1:
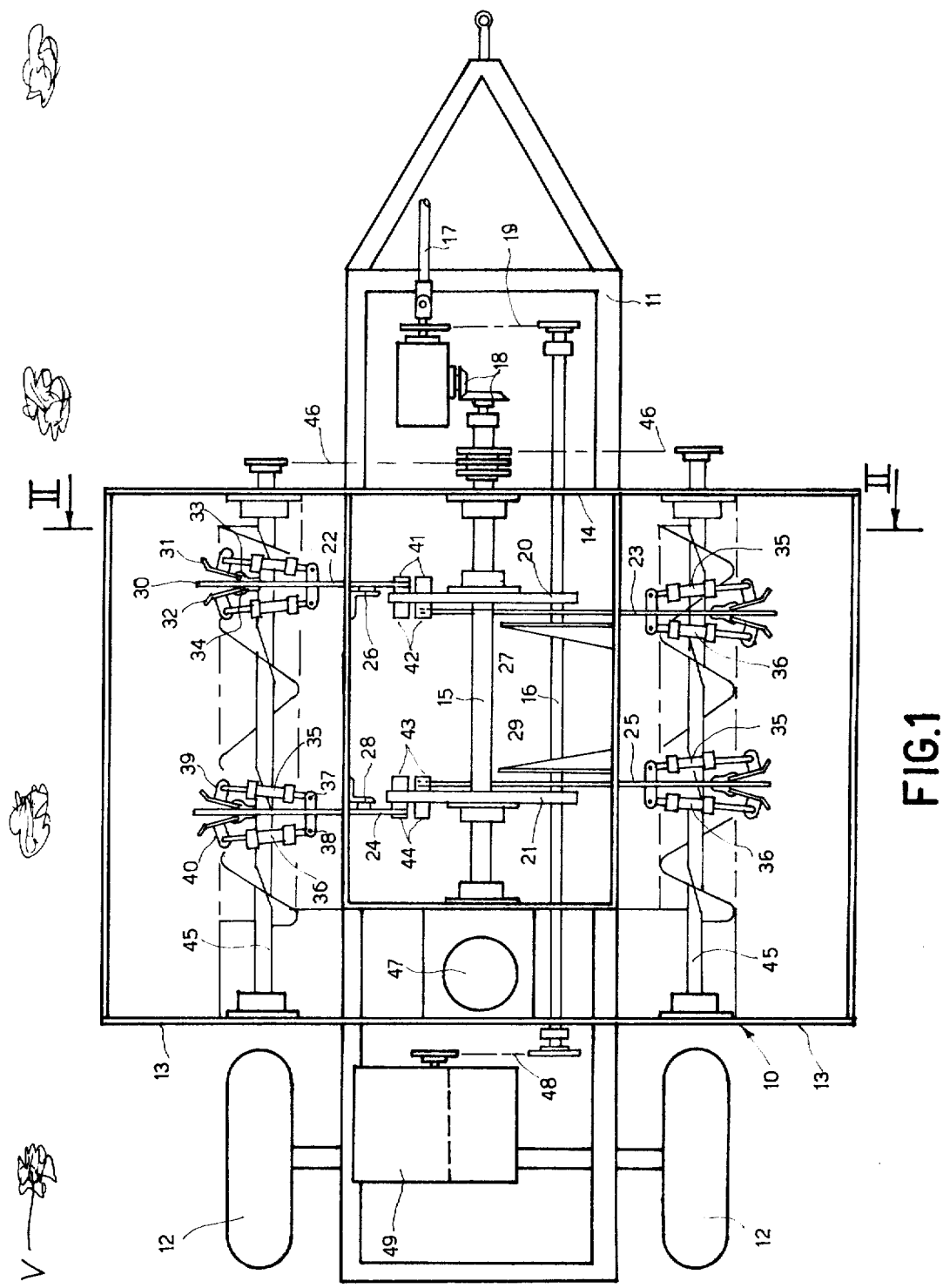
FIG. 1 is a plan view of a first embodiment of the invention.

The machine as a whole is identified in the drawings by the reference number 10 and its basic structure is constituted by a metal frame 11, which is mounted on wheels 12 and which carries side basins 13. A box-shaped supporting structure 14 is fixed on the frame 11 and has a longitudinally extending primary driving shaft 15 and a similarly disposed secondary driving shaft 16 parallel thereto. The shaft 17, connectable to a suitable power take-off, drives the shaft 15 by means of a couple of mutually perpendicular bevel gears 18, and shaft 16 by a belt or chain transmission 19. Axially spaced plates 20, 21 are connected to shaft 15 and are associated with pairs of shaking arms, shown respectively at 22, 23 and 24, 25. The arms are hinged to the supporting structure 14 at 26, 28 and 27, 29 respectively. Each of them has on its free end, three fingers 30, 31, 32 to clasp the vine-branches. A central finger 30 is fixed, while lateral fingers 31 and 32 are pivoted at 33 and 34 for pivotal movements controlled by double-acting pneumatic cylinders 35, 36 respectively. These cylinders are hinged to the shaking arm, while rods of their pistons are hinged at 39 and 40 to projecting parts of the pivoted fingers 31 and 32. The working pneumatic circuit of the cylinders is not shown in the drawings since it is easily understandable by a skilled person.

The operative connection between the plates 20 and 21 and the respective pairs of arms 22, 23 and 24, 25 is effected by circular series of pegs that project out from the faces of each plate and act on the respective arm extremity which is opposite to the clasping fingers. Therefore, three pegs 41, 42 extend out from each side of the plate 20 and operate to move the respective arms 22, 23. Likewise, three pegs 43, 44 extend out from each side of the plate 21 and operate to move the respective arms 24, 25. A return spring 52 (FIG. 2) cooperates with each shaking arm, being mounted on structure 14, as shown, to raise the finger end of the arm, while pegs 41, 42 rotated by plates 20, 21, raise the opposite inner ends of the arms and lower the finger ends.

The bottom of the basins 13 is provided with a screw conveyor 45 which is driven by the shaft 15 through a chain (or belt) 46. In addition, the shaft 15 drives a suction pump 47 whose function is to suck the conveyed must from the screw conveyor towards the outlet of the basins up to a gathering container (which is not shown in the drawings).

A fan 49, blowing air into the inside of the basins through the ducts 50 and the openings 51 (FIG. 2) is driven through a belt (or chain) 48 by the secondary shaft 16.

The embodiment of FIGS. 3 to 8 has means for clasping the vine-branches, connected to endless conveyor belts (or chains) 60 so as to be brought from the outside to the inside of the harvesting machine.

Figure 3:
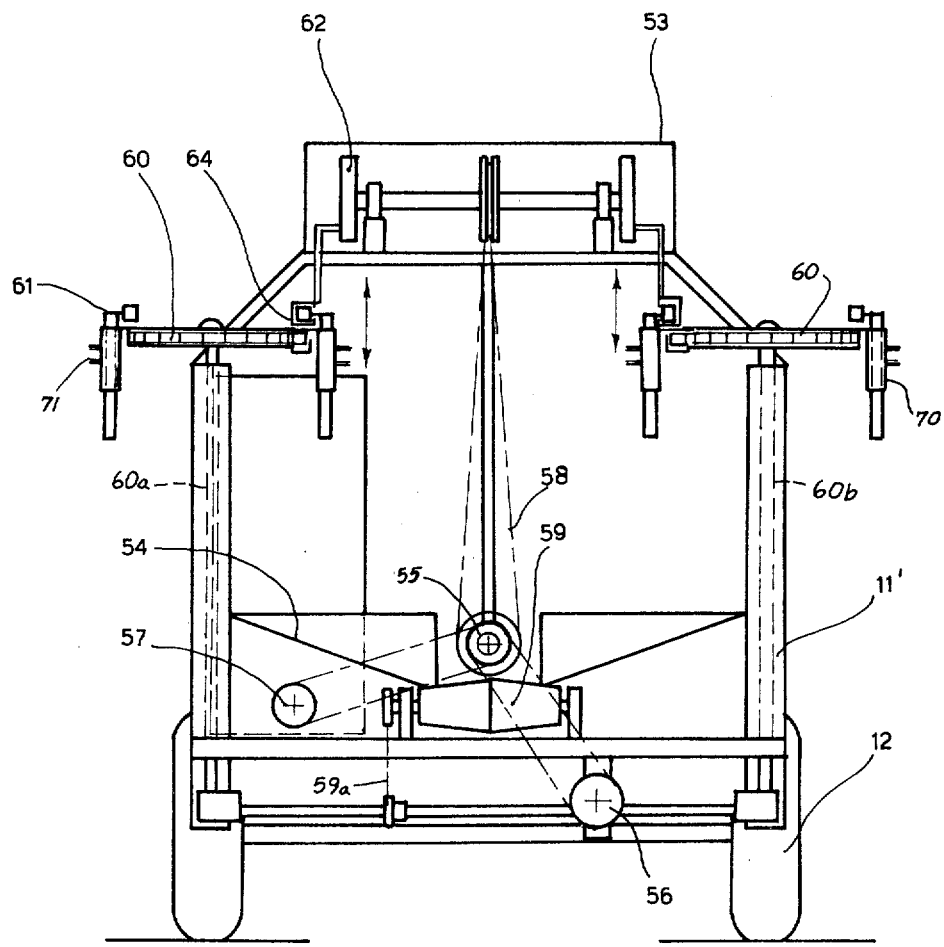
FIG. 3 is a front view of the machine.
Figure 4:
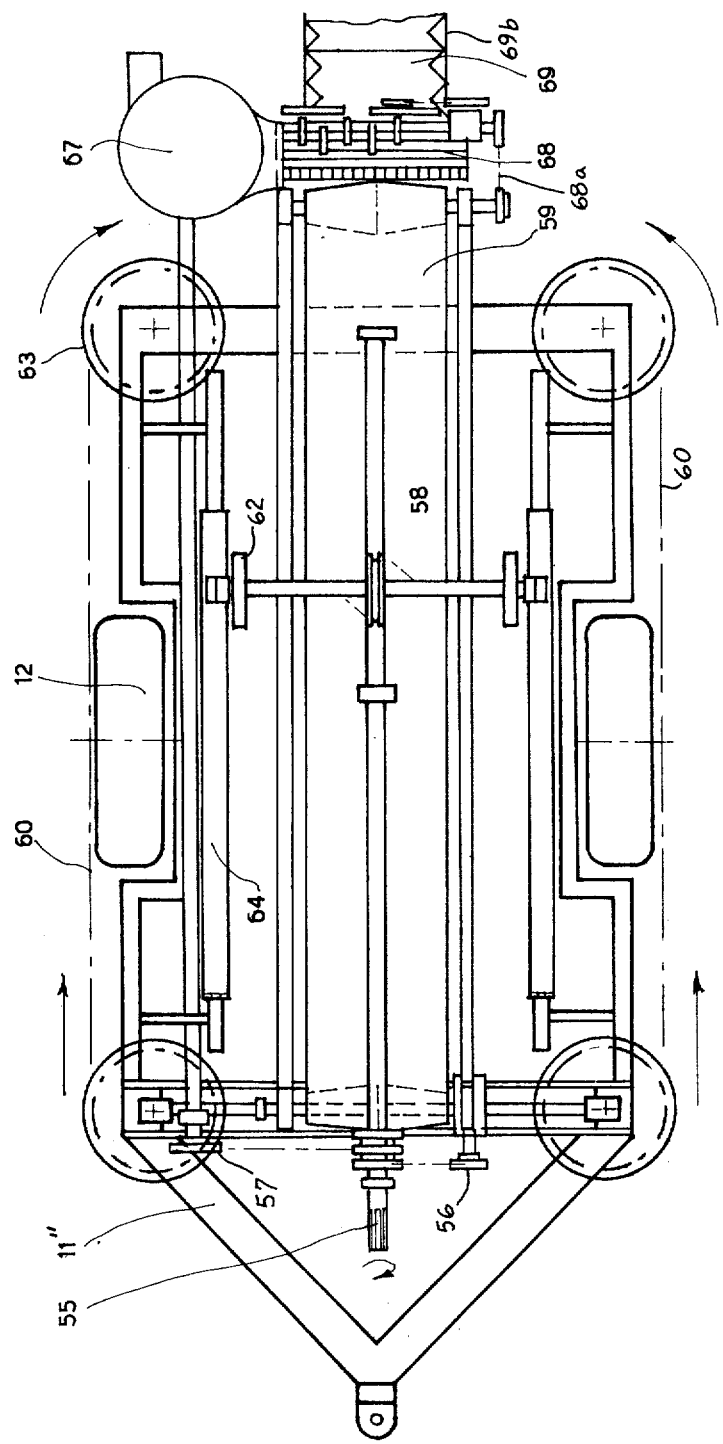
FIG. 4 is a plan view of a second embodiment.

In this embodiment the supporting structure (or chassis) 11 is shown in FIG. 3 as having a lid 53 (omitted in FIG. 4). As shown in FIG. 3, the central part of the machine is equipped with two troughs or tilt-beds 54 inwardly sloping to a longitudinal belt conveyor 59. A power take-off 55 is connected through a chain or belt to a pulley 56, which drives two elevated chains 60 by connections 60a, 60b. This pulley also drives mechanical grid 68 for the selection of grapes, by a drive 68a; and it drives the belt conveyor 59, by connection 59a. The power take-off 55 is also connected by a chain or belt to a pulley 57, which drives a rasping grid 67. Furthermore, the power take-off shaft 55 operates a belt 58 that drives a grape-swinging apparatus 62, 64. This apparatus comprises arms 65 eccentrically connected to rotary disks 62, below lid 53, for causing swaying devices 64 to swing.

Each swaying device 64 as shown by FIGS. 7 and 8, comprises a half-closed guide or laterally open channel member the end of which allows free insertion of a roller 72. The roller is connected to a vertical, rod-shaped vine clasp connector apparatus 61 which it can slide up and down in a vertically oriented guide sleeve 70 (connected to the conveyor 60), and which has clasping means mounted on connector apparatus 61. The clasping means can be generally similar to those shown at 30 to 40 in the first embodiment, being schematically shown at 71 and facing the outside of the machine when the chain runs along the outside (see FIGS. 4 and 7. These clasping means 71 are not shown in FIG. 8). The swinging apparatus, comprising the disk 62 and arm 65, is connected to the swaying or swinging device 64 that can swing freely about a pivot 64a (see the arrow in FIG. 8) and cause vertical reciprocation of the clasping means 61, 71. Thus the apparatus 61, 71 is set in motion by the chain conveyor 60 and by the disk and arm 62, 65 when the roller 70 has entered into the guide 64, which is placed in the central part of the machine and above the gathering troughs 54. When the roller comes to the end of the path within the guide 64, because of gravity it falls out. It then meets a damping cushion 66; then it is pulled on, towards an unhooking point, (not shown) where the vine-branches can be unhooked from the chain conveyor 60 either manually or automatically, as already pointed out above.

A selecting mechanical grid 68 is placed at the end of the belt 59 and above a final belt conveyor 69. Laterally of selecting grid 68 the mechanical rasping grid 67 is placed to further select the grape-berries. The final belt conveyor 69, shown in FIGS. 4, 5 and 6, consists of rubber cups put side by side uninterruptedly. It has elastic outer edges 73 to allow passage of conveyor 69 over rollers 69a at the ends thereof, without interference with flanking walls 69b or with the longitudinal stretching of the cups when they are in proximity to the rollers' curves.

The operation of the first embodiment of the invention can be shortly described as follows.

Figure 2:
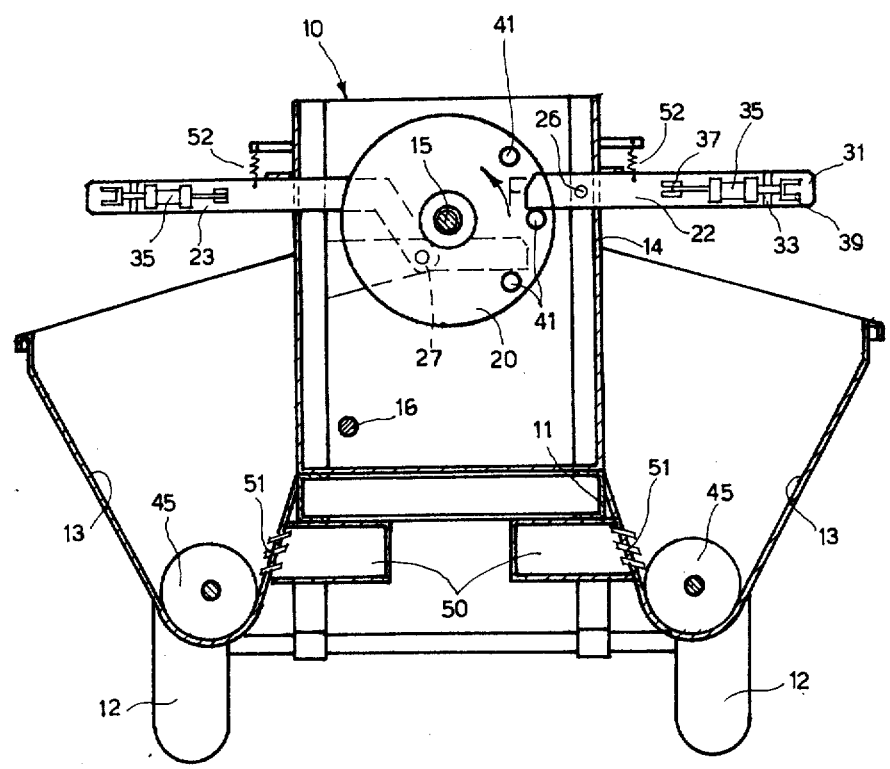
FIG. 2 is a sectional view taken along line II—II of FIG. 1.

The vine branches are manually taken off the vines V (FIG. 1) and attached to and then clasped by the piston-operated fingers of the swinging arms. Assuming that the plates 20, 21 turn counterclockwise (as is shown in FIG. 2 by the arrow F), the arms swing downward and, as soon as the pegs leave their extremities, they are immediately returned upwards by the springs 52. Because of this swinging movement, applied to the vine-branches, the grape-berries are separated from their grape-stalks and fall into the basins 13. The screw conveyors 45 squeeze the grape-berries and convey the must towards the suction side of the pump 47, which discharges it into a suitable container.

At the same time, the air that the fan 49 blows inside the basins, helps to separate the must from the leaves and other impurities.

The working of the second embodiment can be shortly explained as follows:

The vine-branches are taken off the plant and hung to the clasping means, which are then carried towards the inside of the machine. Then the branches are shaken, so that the ripe grape-berries fall and arrive on the belt-conveyor 59. The grapes are separated from the impurities by mechanical grid 68, and sent on to the final rasping grid for final selection of grape-berries.

Although preferred and specific embodiments of the present invention have been illustrated and explained in detail, it is possible to effect changes and modifications to it without exceeding the scope of the invention itself.

For instance it is possible to modify the means for moving the swinging arms, or the clasping fingers, within the scope of the invention.

I claim:

1. A machine for harvesting grape-berries from grape-bunches, without injury to the vine that produces the grapes, comprising;
    a frame which can be moved along a row of vines and positioned adjacent selected ones of the vines;

clasping finger means on the frame, receptive during use of vine-branches manually removed from the vines and which bear grape-bunches, for mechanically releasably clasping the received vine-branches to support the grape-bunches, borne thereby, on the frame, whereas the clasping finger means are and remain detached from the vines themselves;

a mechanism on the frame for shaking the clasping finger means and thereby the vine-branches clasped by them to remove relatively ripe grape-berries from the grape-bunches supported on the frame and thereby to cause the removed grape-berries to fall from the so-supported grape-bunches to a lower location on the frame;

a grape-berry conveyor on the frame for collecting the fallen grape-berries and removing them from the lower location while the clasping finger means continue to clasp the resulting grape-stalks, subject to removal of the grape-stalks therefrom after the falling and collecting of the grape-berries; and drive means on the frame for driving the shaking mechanism and the collecting conveyor;

whereby the vines are protected from injury caused by clasping and shaking, and the collecting of berries is limited to the relatively ripe grape-berries removed from the grape-bunches.

2. A machine according to claim 1 in which the mechanism for shaking the clasping finger means comprises an arm extending from an inner, upper part of a space defined by the frame to a position above the berry conveyor; and a device for swinging the arm for the removing of relatively ripe grape-berries from the grape-bunches supported on the frame.

3. A machine according to claim 2 in which the arm is pivoted to the frame and is biased for pivotal movement of the arm in a first direction; the device for swinging the arm comprising a disk, rotatable by the drive means, and pegs secured to the disk for sequential engagement with the arm to cause pivotal swinging movements of the arm in a second direction subject to disengagement of the arm by the pegs after each swinging movement.

4. A machine according to claim 1 including fluid-operated cylinder and piston means for effecting the mechanical releasable clasping of the vine-branches by the clasping finger means.

5. A machine according to claim 1 in which the mechanism for shaking the clasping finger means includes an endless conveyor parallel to and disposed in a plane above the grape-berry collecting conveyor for conveying grape-bunches consecutively along an outside portion of the frame and above the grape-berry conveyor; and a plurality of clasping finger means secured to the endless conveyor.

6. A machine according to claim 5 in which the clasping finger means comprise a plurality of vertically oriented guide sleeves secured to the endless conveyor, a rod vertically slidable in each sleeve, a roller carried by an upper end of the rod; the shaking mechanism comprising a swingable guide channel disposed on the frame, having one end for receiving the roller and another end for causing the roller to fall from the guide channel, means for intercepting the falling roller, and means for swinging the guide channel.

7. A machine according to claim 6 in which the guide channel is swingable in a vertical plane and the means for swinging it comprises a rotatable disk and a link connecting an eccentric portion of the disk with the guide channel.

8. A machine according to claim 1 including, in said lower location on the frame, a basin receptive of the falling grape-berries and having walls disposed for guiding the fallen grape-berries onto the grape-berry conveyor.

9. A machine according to claim 8 in which the grape-berry conveyor comprises a conveyor screw.

10. A machine according to claim 8 in which the grape-berry conveyor comprises means for conveying the collected grape-berries along the basin to one end of the basin, and means for conveying them from said end to a location on the frame outside the basin, while treating them for the production of must therefrom.

11. A machine according to claim 8 including means on the frame for blowing air into a lower portion of the basin to remove impurities, such as vine-leaves, from the collected grape-berries.

* * * * *